United States Patent
Akiti

(10) Patent No.: US 9,232,420 B1
(45) Date of Patent: Jan. 5, 2016

(54) AUTOMATED NETWORK TESTING USING IN-PROGRESS CALL DETAIL RECORDS

(71) Applicant: Sprint Communications Company L.P., Overland Park, KS (US)

(72) Inventor: Tetteh Akiti, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 133 days.

(21) Appl. No.: 14/186,968

(22) Filed: Feb. 21, 2014

(51) Int. Cl.
*H04W 24/00* (2009.01)
*H04W 24/06* (2009.01)

(52) U.S. Cl.
CPC .................................. *H04W 24/06* (2013.01)

(58) Field of Classification Search
USPC ........................................................ 455/423
See application file for complete search history.

(56) References Cited

U.S. PATENT DOCUMENTS

| 5,978,940 A * | 11/1999 | Newman ............... H04Q 3/0087 714/712 |
| 2009/0268713 A1* | 10/2009 | Ottur .................... H04L 12/2602 370/352 |

* cited by examiner

Primary Examiner — Joel Ajayi

(57) ABSTRACT

A method provides automated testing of a network. The method comprises controlling an originating mobile communication device by a server and commanding origination of a call from the originating mobile communication device to a destination communication device. The call is associated with a raw call detail record that is unprocessed. The raw call detail record is monitored on a raw call detail record storage. The method also comprises confirming the raw call detail record accounts for origination of the call from the originating mobile communication device. The destination communication device is controlled by the server, and control is confirmed based on a communication log. The method captures the confirmation that the raw call detail record accounts for the origination of the call and the confirmation that the destination communication device is controlled by the server. Based analysis of the captured confirmations, a baseline metric of expected test results is generated.

20 Claims, 9 Drawing Sheets

AUTOMATED NETWORK TESTING USING IN-PROGRESS CALL DETAIL RECORDS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication devices are being used to influence societal norms and further economic developments across the globe. Yet the devices themselves must rely on a stable and functional network infrastructure that provides service of network calls in varying scenarios. Despite providing a range of call features for network use, network subscribers may discover that a particular sequence of calls yields a failure or service error of network functionality. But prior to accessing and understanding the call sequence leading up to the failure, a communication service provider may have to wait for information about a call sequence to be compiled and processed; thereby increasing the time of identifying and resolving the issue. Experiencing repeated failures can frustrate subscribers because of a perception that they are paying for a service that the communication service provider is unable to effectively provide. Because customers may readily switch communication service providers, quickly minimizing and preventing user frustration is a concern of network operators.

SUMMARY

In an embodiment, a computer-implemented method of automated testing of a network is disclosed. The method comprises controlling an originating mobile communication device by a server and commanding origination of a call from the originating mobile communication device to a destination communication device. The call is associated with a raw call detail record that is unprocessed. The raw call detail record on the network is monitored on a raw call detail record storage. The method further comprises confirming that the raw call detail record accounts for origination of the call from the originating mobile communication device. The destination communication device is also controlled by the server. The method confirms the destination communication device is controlled by the server based on a communication log of the destination communication device. The method further comprises capturing the confirmation, from the raw call detail record storage, that the raw call detail record accounts for the origination of the call and the confirmation, from the communication log of the destination communication device, that the destination communication device is controlled by the server. Based on analysis of the captured confirmations, a baseline metric of expected test results is generated.

Another embodiment of a computer-implemented method of automated testing of a network is disclosed. The method comprises activating, by a testing application executing on a server, a feature action associated with configuration of the network. The feature action comprises using a predefined function. A confirmation is generated of activation of the feature action. Responsive to confirming activation of the feature action, the testing application commands origination of a call from the originating communication device while the feature action is activated. The call is associated with a raw call detail record that is an unfinished call detail record. The method further generates a confirmation of origination of the call from the originating communication device while the feature action is activated based on a communication log of the originating communication device. A confirmation is generated that the raw call detail record reflects occurrence of the predefined function of the feature action. Based on the generated confirmations, the testing application commands conclusion of the call from the originating communication device.

In an embodiment, a system for automated testing of a network is disclosed. The system comprises at least one communication device, a raw call detail record storage, a test storage, a monitor component, and a computer. The at least one communication device includes a processor, a non-transitory memory, and a communication application stored in the non-transitory memory that, when executed by the processor, generates a communication log associated with the communication device. The communication device also includes a communication module that communicatively couples the communication device with a computer. The communication device further includes a control interface module that, when executed by the processor, is configured to control functionality of the communication device. Both the test storage and raw call detail record storage include a non-transitory memory, with the raw call detail record storage comprising a plurality of raw call detail records. The monitor component is configured to access and inspect the raw call detail records. The system also comprises the computer that includes a processor, a non-transitory memory, and a testing application stored in the non-transitory memory. When executed by the processor, the testing application causes the processor to perform operations comprising controlling the communication device and commanding origination of a call from the communication device. The origination of the call triggers the communication application of the communication device to generate a communication log. The call is associated with both the communication log of the communication device and a raw call detail record.

Continuing with the embodiment, the testing application further orders operations comprising monitoring the communication log associated with the call of a communication device. The communication log is generated by the communication application executing on a processor. The application also causes monitoring of the raw call detail record that is in a native state on a raw call detail record storage, wherein the raw call detail record is associated with the call. Both the communication log and raw call detail record are confirmed to account for the origination of the call. The application then determines whether the confirmations of the communication log and raw call detail record match an expected result. Responsive to a determination that the confirmations of the communication log and raw call detail record match the expected result, the application triggers the execution of a predefined function. Responsive to a determination that the confirmations of the communication log and raw call detail record do not match the expected result, the application commands termination of the call from the mobile communication device. Additionally, the determinations are logged in a test storage.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
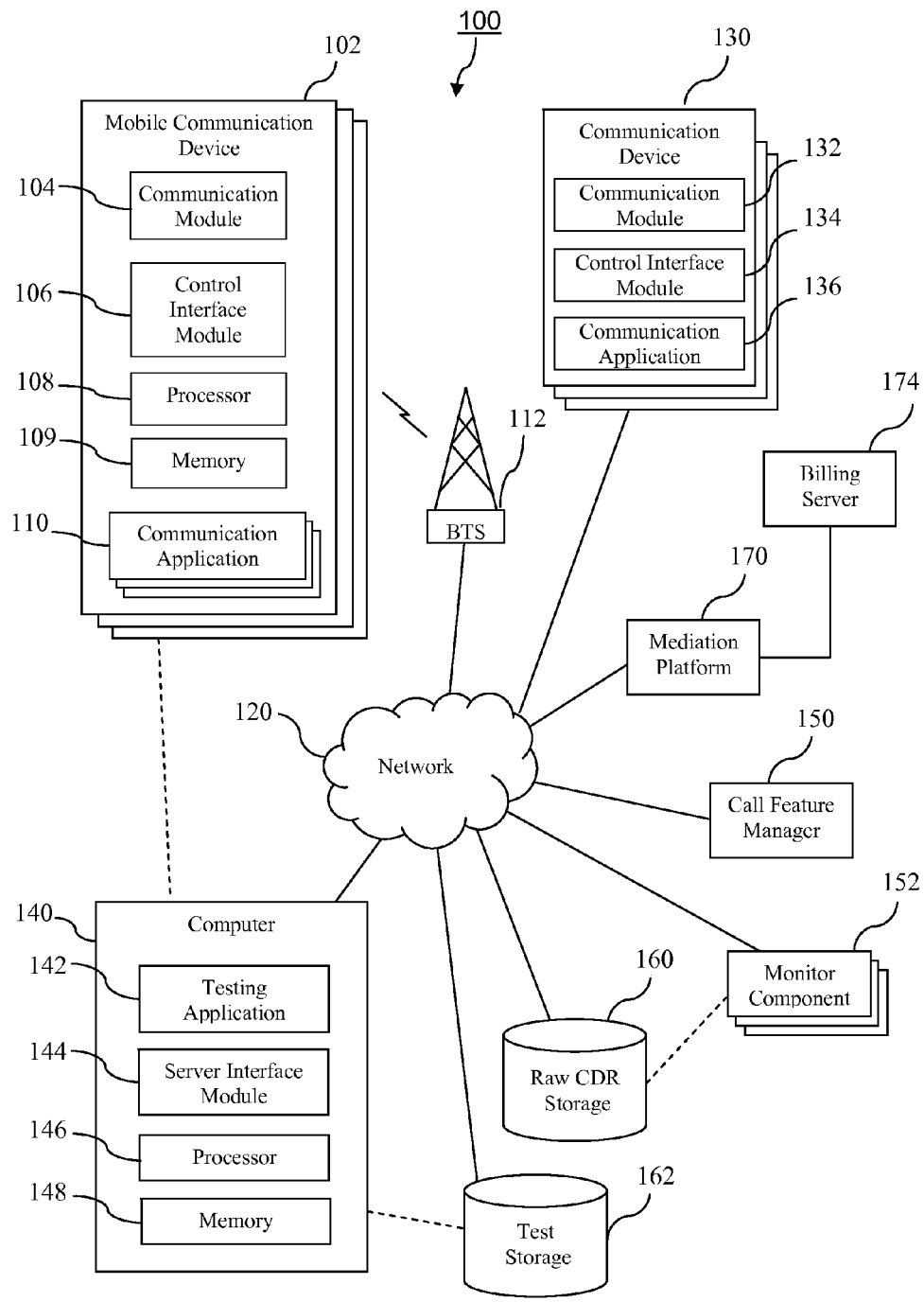
FIG. 1a is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In the modern marketplace, retention and addition of customers is a priority for communication service providers. When a customer experiences difficulties in operating a communication device or using an offered service, the customer may not take the time to alert the provider of the problem. Thus, a provider may attempt to identify issues, thereby mitigating and resolving problems before they are experienced by the customer. Yet as hardware and software evolve, identifying anomalous behavior of network services can be difficult, particularly if a problem occurs only when a particular sequence of network functions is engaged. Upon adding factors like call features, types of communication devices, and types of network connections, the scenarios and sequences in which problems may occur quickly increase. Thus, the present disclosure teaches a system and method for the identification and mitigation of network errors.

The present disclosure teaches automated network testing of network and test device functionality by using the synergistic results of checking both in-progress call detail records (raw call detail records) generated by the network and at least one endpoint communication log generated by a test device while the test is ongoing. Additionally, controlling the test device (i.e., one of the communication devices used in the test) and the activation of a sequence of network features (i.e., actions associated with configuration of the network that allows a predefined function to take place, like activating three-way calling on the network that allows multiple test devices to communicate during a call) allows for alternating test steps dependent on analysis while the test call is occurring.

For example, a provider may wish to test the functionality of a three-way voice call using a first mobile communication device that engages with a second mobile device and a landline. A provider may discover a problem with the three-way voice call when a calling party (i.e., the first mobile communication device) first connects with the second mobile device and then the landline. Because of in-call analysis, the provider may change the call sequence and discover that a three-way voice call successfully engages if the calling party first connects with the landline and then connects with the second mobile device. In diagnosing whether the network and/or each test device (i.e., the first and second mobile communication devices and landline) is functioning correctly, the provider may check associated test device communication logs and/or in-progress call detail records related to the performed function. Yet had the provider tried to use call detail records (i.e., call records used by providers to determine how a customer is billed), access to the call detail records may not be available for hours or even days due to a process called mediation. An example of a mediation process may be one of processing and transforming information about a call into a form more readily understandable by a customer.

The present disclosure teaches a testing application obtaining, and confirming test device communication activity by going to a raw call detail record storage (e.g. a network element like a switch) where raw call detail records are created, and accessing the raw call detail record during the test call. Similarly, the testing application may obtain access to communication logs created by a test device and compares the information from the communication logs with the raw call detail records before waiting for the mediation process. Comparison may yield a test success or failure that may be determined by comparing test results (e.g., information from communication logs and/or raw call detail records) to expected results and/or a baseline metric. Test success/failure may be analyzed at each step of the call flow and may depend in part on an in-progress call detail record (i.e., a raw call detail record that is being created through the addition of information) having an expected state, an expected form, and/or expected values (i.e., matching expected results or baseline). Mere observation and confirmation of test success or failure at call endpoints (i.e., only upon initiation of the test and after the test is finished) requires a time delay and does not provide detail for a provider to know where an error occurs during the test. The identification, comparison, and confirmation of test information using in-progress call detail records and test device communication logs helps facilitate a time efficient resolution of problematic network functions and services by identifying the point and stage of an error.

By way of analogy, consider an author who sits down to write a novel, and a person who avidly reads the published novels of the author. Typically, the avid reader must wait until the author finishes writing, editing, and publishing the novel before she may read and understand its contents, while also determining if the author made an error. This is analogous to a mediation process in which access to communication activity is readily available after processing and transformation of the raw call detail record—that is the raw, unprocessed information about a call. Continuing with the analogy, consider an avid reader who does not wait, but instead makes contact with the author, gains access to the writings prior to editing or publication, and begins reading the novel's transcript as the author is writing it, or before the novel is ready for presentation to the public. This allows the avid reader to know if an error occurred at the stage of the author, editor, or the printer. Similarly, in an embodiment, a provider uses a testing application to monitor, verify, and confirm communication activity of a test device by accessing a raw call detail record by going to its source while it is being created (i.e., in-progress) and/or shortly thereafter without waiting for a mediation process and without altering the source contents. Thus, instead of simply knowing an error occurred, the provider may understand when, how, and the circumstances surrounding an error's occurrence.

Turning now to FIG. 1a, a communication system 100 is described. In an embodiment, the system 100 comprises a plurality of mobile communication devices 102. The mobile communication device 102 may comprise a communication module 104, a control interface module 106, a processor 108, a memory 109, and one or more communication applications 110. The mobile communication device 102 may be configured to use the communication module 104 to establish a wireless communicative link with a base transceiver station (BTS) 112, where the base transceiver station 112 may provide communications connectivity of the mobile communication devices 102 to a network 120. The network 120 may comprise any combination of private and/or public networks. In some embodiments, the network 120 may be a comprise a virtual network—that is, a simulated network used in a laboratory setting to recreate and/or mimic the functionality of real-world network 120 actions. For example, a communication service provider may want to perform tests on a certain subset of the network 120 but does not want to impede network 120 traffic. The test supervisor may simulate the network 120 (or subsets therein) in a laboratory setting so as to not disrupt the functionality of the live network 120.

It is understood that the system 100 may comprise any number of mobile communication devices 102, which may be connected with any number of base transceiver stations 112. The collectivity of base transceiver stations 112 may be said to comprise a radio access network, in that these base transceiver stations 112 may provide radio communication links to the mobile communication devices 102, thus providing access to the network 120 and other devices and systems coupled to the network 120. The radio access network may be abstracted in different ways and may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The mobile communication device 102 may be any of a mobile phone, a tablet, a personal digital assistant (PDA), a media player, a wireless enabled computer, or other mobile communication device 102. In an embodiment, the mobile communication device 102 may have other components (not shown) such as a near field communication (NFC) radio transceiver, a wireless local area network (WLAN) radio transceiver, or other components.

Figure 7:
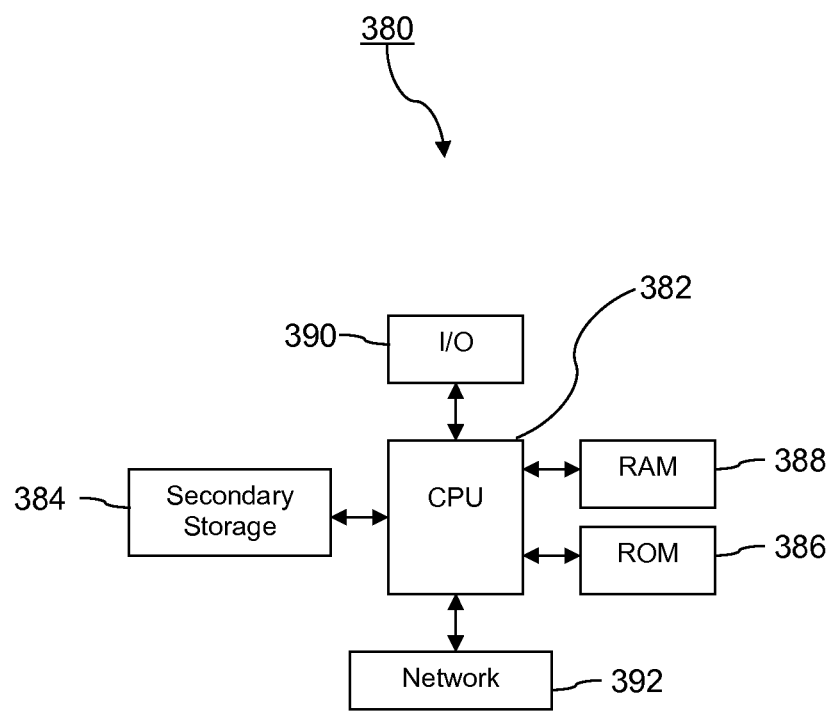
FIG. 7 is a block diagram illustrating an exemplary computer system suitable for implementing the several embodiments of the disclosure.

In some embodiments, a communication module 104 may include a plurality of forms and/or functions of a network connectivity device 392 described hereafter in FIG. 7. For example, a communication module 104 may include a radio transceiver and a universal serial port for communicatively coupling the mobile communication device 102 with the network 120 and a computer 140. The communication module 104 may communicate with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. In some embodiments, the communication module 104 may be configured to distinguish and report various communicative states or activities between the mobile communication device 102 and the radio access network. For example, the communication module 104 may be configured to report when a call from a first mobile communication device is originating, and when the call is answered by another (second) communication device.

The control interface module 106 may comprise any of an application, bridge daemon, or other interface that may expose application programming interfaces (APIs) for controlling and commanding functions from the mobile communication device 102. In some embodiments, the control interface module 106 may comprise a client program and/or a daemon background process. In some contexts, the control interface module 106 may be configured to originate and/or initiate a call from the mobile communication device 102 when instructions are given via an API. For example, a testing application 142 may interact with a server interface module 144 on a computer 140, the testing application directs the mobile communication device 102 to start or stop a call by communicatively interacting with APIs of the control interface module 106 thereby controlling the functionality of the mobile communication device 102. Such functionality may include the testing application 142 ordering the mobile communication device 102 to originate a voice call via the radio access network. The control interface module 106 may generate communication logs, and/or provide access to communication activity to applications, such as testing application 142 and/or communication applications 110. In an embodiment, the control interface module 106 may access logs generated by a communication application 110. In some embodiments, the control interface module 106 may execute a client process that receives and/or executes commands for controlling the device 102 from another application and/or process, such as the testing application 142 and/or the server interface module 144. It is understood that communication logs may be generated upon a triggering event, such as a mobile communication device 102 and/or communication device 130 engaging in a call.

The control interface module 106 may be standard software delivered by an original equipment manufacturer (OEM) who assembles the mobile communication device 102. In some contexts, the control interface module 106 may be stored as firmware or software in the non-transitory memory 109 of the mobile communication device 102. In an embodiment, the testing application 142 may access the communication logs of the mobile communication device 102 and/or the communication device 130 and store the communication logs (or other information corresponding to the logs) in a storage (e.g., test storage 162). Alternatively, the testing application 142 may communicate with a communication application 110, 136 to generate communication logs by capturing information on the mobile communication device 102 and/or communication device 130, and parsing the captured information for analysis and storage. In an embodiment, parsed information may be compared and/or analyzed by an application (e.g., testing application 142) with information obtained from at least one raw call detail record on a raw call detail record storage 160. Alternatively in some embodiments, parsed information may be obtained directly from a communication device (e.g., 102 and/or 130) without referencing a communication log by an application (e.g., testing application 142) accessing a display of a mobile communication device 102 and parsing displayed information (e.g., call connection status, time of call, etc.) for comparison and analysis.

Figure 5:
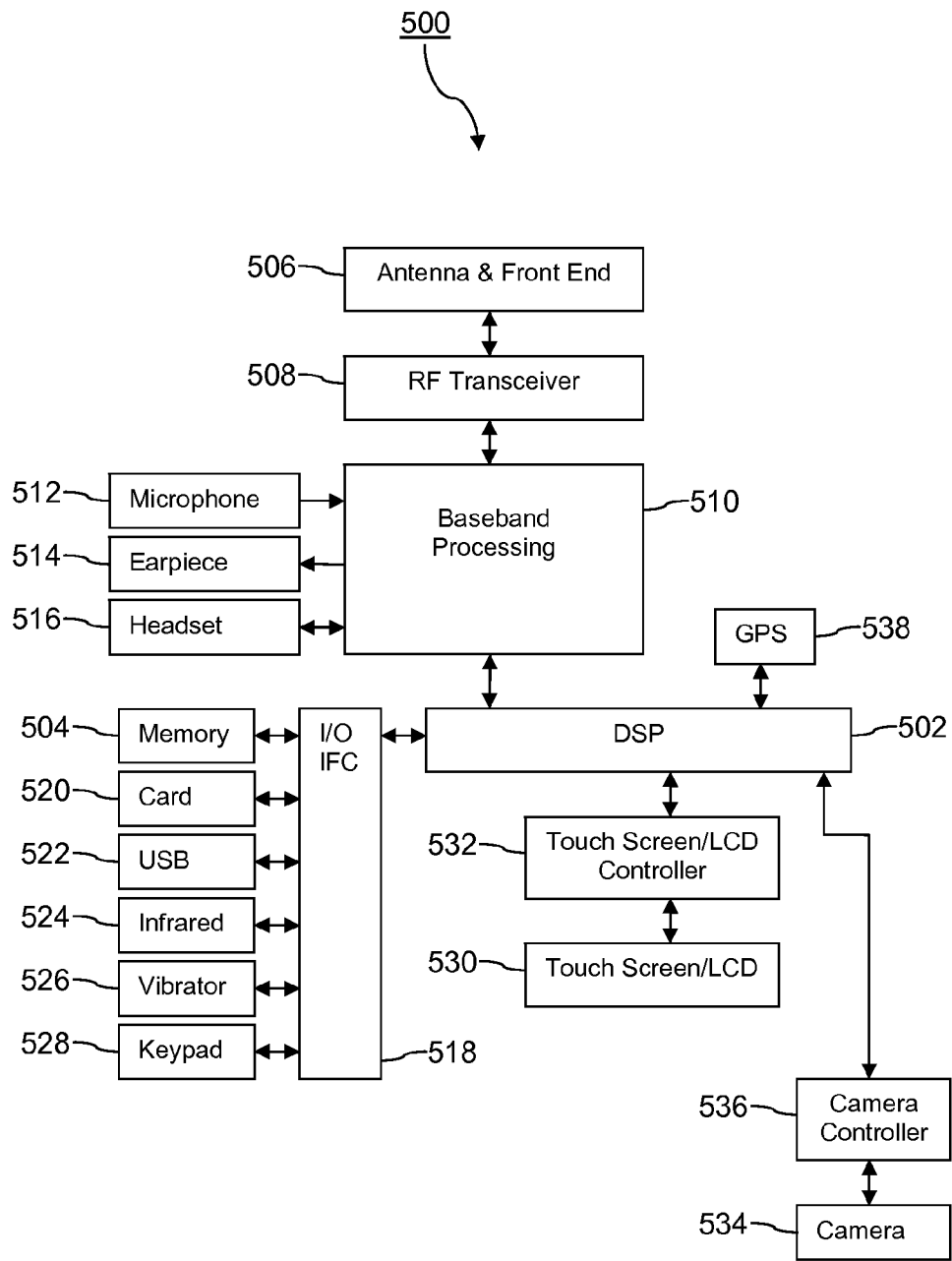
FIG. 5 is a block diagram of a mobile communication device suitable to implement the several embodiments of the disclosure.

In some embodiments, references to a processor (e.g., processor 108) may include, but is not limited to, a plurality of forms described hereafter, such as FIG. 5 digital signal processor 502 and FIG. 7 processor 382. In some contexts, references to memory (e.g. memory 109) may be referred to as non-transitory computer readable medium, non-transitory memory, or a computer readable storage media. The memory 109 may include forms described hereafter in FIG. 7, such as secondary storage 384, ROM 386, and/or RAM 388.

The communication applications 110 may comprise a voice communication application, a data communication application, a web browser application, an email application, a short message system (SMS) or texting application, a multimedia message system (MMS) application, and other communication applications. The communication applications 110 may be standard communication applications that are delivered by an original equipment manufacturer (OEM) who assembles the mobile communication device 102. The communication applications 110 may be stored as firmware or software in a storage of the mobile communication device 102. The communication applications 110 may expose application programming interfaces (APIs) accessible to other applications, for example to the control interface module 106, to provide wireless communication functionality to the other applications, such as testing application 142.

The system 100 may also comprise a plurality of communication devices 130. A communication device 130 may include any of a mobile communication device 102, a landline communication device, digital telephones, videophones, or voice over internet protocol (VOIP) telephone. It is understood that a landline communication device may take the form of a telephone that is configured to use a solid medium telephone line for communicative transmission, including both hard-wired and/or cordless wireless devices. In some contexts, the communication module 132 may include the possible forms and/or functions of communication module 104, but the communication modules 104 and 132 need not be the same. For example, the communication module 104 of the mobile communication device 102 may comprise a radio transceiver for wireless communicative link with the network 120, while the communication module 132 of the communication device 130 comprises a modem for a hardwired communicative link with the network 120.

In some embodiments, the communication module 132 may comprise a standalone module that is communicatively coupled to the communication device 130. The communication module 132 may include a separate processor and/or storage, and/or may interact with a remote processor and/or storage accessible via the network 120 or via direct connection. The communication module 132 may execute logic that is configured to listen, monitor, and detect communicative transmissions between the network 120 and the communication device 130. Alternatively, the communication module 132 may be configured to detect and process activities of a communication device 130, such as activities of making or receiving a call with communication device 130. For example, the communication module 132 may be configured to detect when a phone call is placed (e.g., by mobile communication device 102 or communication device 130) and when the placed phone call is answered by the called device (e.g., communication device 130 or mobile communication device 102). In some contexts, the communication module 132 may associate with the control interface module 134 and/or the communications applications 136 to log communicative activities, such as the call start, call status, and end of calls. In an embodiment, the communication module 132 may interact with the testing application 142 in communicating information from communication logs associated with the communication device 130.

In some embodiments, the control interface module 134 may include the possible forms and/or functions of control interface module 106. In some contexts, the control interface module 134 may be configured to enable a remote device and/or application to control, originate, and/or initiate calls from the communication device 130. For example, a testing application 142 may use the server interface module 144 to communicate with the control interface module 134, thereby enabling control and origination of a call from the communication device 130 to the mobile communication device 102. The control interface module 134 may comprise a client program and/or a daemon background process. In some embodiments, the control interface module 134 may execute logic as a client process that receives and/or executes commands from another application, script, and/or process, such as the testing application 142 and/or logic executed by the server interface module 144. In some contexts, the control interface module 134 may comprise a standalone module that executes logic for receiving commands to control the communication device 130. The control interface module 134 may also be communicatively coupled with the communication device 130, while also being accessible via the network 120.

The communication applications 136 may comprise the form and/or functions of the communication application 110, including any of a voice communication application, a data communication application, a web browser application, an email application, a short message system (SMS) or texting application, a multimedia message system (MMS) application, and other communication applications. In some contexts, the communications applications 110 may not comprise the same forms as the communication application 136. For example, the communication application 110 may include a voice communication applications and a data communications application, while the communication application 136 includes only a voice communication application.

It is understood that the communication applications 136 may be standard communication applications that are delivered by an original equipment manufacturer (OEM) who assembles the communication device 130. The communication applications 136 may be stored as firmware or software in a storage of and/or accessible by the communication device 130. The communication applications 136 may expose application programming interfaces (APIs) accessible to other applications and/or modules (e.g., to the control interface module 132), to provide wireless communication functionality to another application, such as testing application 142.

In an embodiment, the system 100 comprises a computer 140 that includes a testing application 142 executable by the processor 146 and may be stored in the non-transitory memory 148 or another storage. The computer 140 may also include a server interface module 144. In some embodiments, the computer 140 may be implemented as a network of computer processors, such as mainframe computers, networked computers and similar types of systems and devices. In some contexts, the computer 140 may be a server that a communication service provider uses to access and control any of a mobile communication device 102, a communication device 130, and/or an emulated communication device. For example, the testing application 142 may set up an emulated object that includes the form and/or function of a device including any of a mobile communication device 102 and/or a communication device 130. In some embodiments, the computer 140 may interact with the mobile communication device 102, communication device 130, and/or emulated communication device by a direct wired connection and/or via the network 120. In some illustrations, dashed lines connecting devices (or other illustrated elements of a figure such as mobile communication device 102 with computer 140) represent a direct connection between the devices that optionally may be wired in some operation modes, for example in a laboratory test environment.

In an embodiment, the testing application 142 enables a communication service provider to test at least some of the operations associated with any of the network 120, the radio access network, elements or segments thereof, and/or devices 102, 130 (whether physical or emulated). In some embodiments, any of the network 120, a designated subset of the network 120, radio access network and/or elements thereof, may be collectively referred to as the network under test, or system under test. In an embodiment, the network under test may comprise all of or any subset of the radio access network, a core of the network 120, a plurality of mobile communication devices 102, and/or communication devices 130. It is understood that the mobile communication device 102, communication device 130, and/or an emulated communication device that is associated with the network under test may be referred to as a test device. An emulated communication device may include a virtual mobile communication device and/or virtual communication device.

In an embodiment, the testing application 142 may be executed on the computer 140 or on a server accessible via the network 120. The testing application 142 may comprise computer instruction segments that are configured to communicate with the network under test, and/or devices connected to the computer 140. It is understood that the testing application 142 may implement a modular design architecture such that the implementation of various test scenarios is possible. The testing application 142 may be configured to receive information from test devices and/or from elements of the network under test. In an embodiment, a testing application 142 may receive and/or retrieve and/or read information about a raw call detail record as the raw call detail record is being created, and such information may be used for any of processing, manipulation, and/or storage. In this embodiment, the testing application 142 may be used in conjunction with the server interface module 144 for controlling devices—such as 102, 130—and may execute background processes on the computer 140.

The testing application 142 may be configured to command the control of the mobile communication device 102 and/or the communication device 130 by interacting with a process of the respective control interface module 106, 134. The testing application 142 may use the server interface module 144 to setup communicative connections, such as by arranging ports on any of the mobile communication device 102, communication device 130, and/or emulated device via the network 120 or a direct communicative link. In an embodiment, the testing application 142 uses the server interface module 144 to manage connections to devices and to handle commands from applications.

In an embodiment, a testing application 142 executes logic for controlling a test device, such as the communication device 130 and/or the mobile communication device 102. The testing application 142 may command origination of a call from a test device and the call may trigger generation of at least one communication log. It is understood that a communication log may be a record of communication activities according to a test device, whereas a call detail record may be a record of call activities with a test device. In an embodiment, the testing application 142 may initiate monitoring of at least one communication log of the test device and a raw call detail record that is associated with the call. In an embodiment, the testing application 142 may monitor the communication log by accessing it via the respective communication module 106, 134 of the respective test device 102, 130. The raw call detail record may exist on a storage, e.g., raw CDR storage 160, which may be communicatively accessible via the network 120, as later disclosed herein. The testing application 142 may monitor the raw call detail record to analyze contents for determining if the network under test is functioning as expected. In an embodiment, monitoring of at least one raw call detail record may include controlling a monitor component 152 that may command access to the raw call detail record and inspect it.

As later described, the testing application 142 may be configured to analyze communication logs and/or raw call detail records for determining, confirming, and comparing information obtained during testing. For example, when the computer 140 commands control of a communication device 130 and places a call, the testing application 142 may expect that communication logs and/or a raw call detail record will reflect occurrence of the placed call. Part of complex call flow behavior in the production environment or in the "real-world" environment of the network may involve making a sequence of modifications of records kept about the in-progress call (e.g., adding content during creation of raw call detail records, communication logs). Accordingly, testing the complex call flow behavior may entail determining or verifying that the raw call detail records and/or communication logs associated with the subject test call assume the expected state or series of expected states as the call flow progresses. In this embodiment, the testing application 142 may refer to expected results that associate with a planned outcome when a call is placed. In an embodiment, when information in the communication log and/or raw call detail record from the network under test does or does not match expected results, the testing application 142 may proceed with alternative steps. It is understood that information may be considered to match (or not match) an expected result when the analyzed information is within a predefined level of variation set by the testing team. In an embodiment, alternative steps may include the testing application 142 triggering execution of a predefined function or commanding termination of the call from the test device. By way of example, when a network under test includes testing a conference call between a mobile communication device 102 and a plurality of communication devices 130, the testing application 142 may determine that the communication logs and raw call detail records for each of the respective test devices matches expected results, such as the call being placed, call being received by the test devices, and functioning of multiparty call. Further embodiments of predefined functions are disclosed below herein.

The testing application 142 may be communicatively connected with the server interface module 144. In an embodiment, the server interface module 144 may comprise any of software and/or firmware that executes logic to interact with APIs exposed by the control interface modules 106, 134 of the respective mobile communication device 102 and the communication device 130. Similarly, the server interface module 144 may interact with APIs exposed by the monitor component 152 for monitoring raw call detail records 160. The server interface module 144 may comprise software configured as a server program for communicating with client software and/or firmware, such as the control interface module 106, 134, executing on a respective mobile communication device 102 and/or communication device 130. It is understood that a server interface module 144 may comprise a command line interface that commands communicative interaction with targeted objects, such as any of a monitor component 152, emulated device (i.e., a virtual device), mobile communication device 102, and/or the communication device 130 or components therein.

In some embodiments, the testing application 142 may include a graphical user interface (GUI) and/or command line interface (CLI) (that are displayable on a screen) that enables selection of a variety of testing scenarios, such as calls, call sequence, feature actions, and/or predefined functions. In an embodiment, a custom test scenario may be implemented such that a specific type of call sequence, feature action, and/or predefined function is tested on the network 120. In an alternative environment, test scenarios may be selected from a pool of possible test scenarios, and may be selected at random. It is understood that a call includes any of a voice call, data call (e.g., a video or data transfer communication), short message service (SMS), multimedia message service (MMS), utility calls, or the like that may be executed on a communication device. It is understood that a utility call may include any of resetting (e.g. resetting software or firmware), powering up or powering down, and/or entering commands for communication devices (e.g., 102 or 130, physical, or emulated). In an embodiment, a call sequence may include a call with a communication device 102 and/or 130 (i.e., physical or emulated), a telephone number, a server, or a specific element of the network 120. By way of example, a call sequence may include any combination of calls between a mobile communication device 102 (e.g., a mobile phone), a communication device 130 (e.g., a landline telephone), an emulated device, a number (e.g., a toll-free number), or other test devices.

In an embodiment, the testing application 142 may execute logic commanding activation of feature actions from a mobile communication device 102 and/or communication device 130, where the feature action corresponds with a predefined function. In some contexts, the feature action may comprise a specified code and/or instruction that, when commanded (e.g., executed instructions by the test device or other commanding application), invokes a sequence of predefined or programmable functions involving the operations of the network under test, which may include the radio access network and/or the network 120. Thus, an embodiment of activating a feature action can activate a network feature, that is a feature action associated with configuration of the network such that a predefined function may occur. In an alternative embodiment, a test device may have a device feature, such as the ability to display or not display a caller ID, and activating a feature action may be directed and/or associated with configuration of the test device. However, embodiments directed to a particular call sequence using the network will likely activate a feature action associated with the network, wherein the predefined function allows for a particular type of test and/or call to take place using the network.

For example, the feature action commanded from the test device may comprise the code "asterisk, six, nine" (*69) that is intended to command a predefined function on the network under test—here the predefined function is for the test device to place a call to a destination device, where the destination device most recently called the test device invoking the feature action. The feature action may be associated with the test device originating the feature action, another test device (such as a destination landline), and/or another element of the network under test. In some embodiments, the feature action may comprise a command for an element of the network 120 to engage in the predefined function. For example, a testing application 142 may command activation of a caller identification feature action (e.g., colloquially known as caller ID) that uses a predefined function for prompting the mobile communication device 102 to display or not display an identifying phone number when calling a test device.

Examples of predefined functions include, but are not limited to, any of caller identification visibility, call forwarding (universal and/or programmable), call waiting, call transferring, call hot lining, call barring (incoming and outgoing), multi-party calling (e.g., three-way calling), call busy, call no answer, call block, information retrieval, call voicemail, call path verification, dropped call, assistance call, bill payment, wireless number portability, data file transfer (e.g., FTP, HTTP uploads and/or downloads), SMS/MMS message, or other custom calls that may include only one party. It is understood that implementation of some feature actions using predefined functions may require provisioning of devices and/or elements of the network 120. It is understood that any number of predefined functions may be combined with calls in a variety of sequences that may be between a plurality of test devices.

For example, a testing application 142 may originate a call from a mobile communication device 102 to call two landlines, where a feature action is activated that corresponds with the predefined function of a conference call that is intended to engage all three test devices in a multiparty call. Alternatively, for example, an application may command a feature activation that provisions an element of the network 120 and/or a destination mobile communication device with a predefined function of incoming call barring, such that when an originating mobile communication device calls the destination mobile communication device, the call is not delivered to the destination mobile communication device and the originating mobile communication device is routed to an element of the network 120. In some embodiments, a testing application 142 may verify that a predefined function performed according to its intended function and/or had correlated with an expected result.

In some embodiments, a call feature manager 150 may communicatively couple with the network 120 and/or the radio access network. The call feature manager 150 may be enabled to configure and setup the predefined functions for the communication service provider associated with the network under test. For example, the testing application 142 may command a call from a mobile communication device 102 and activation of caller identification visibility block for other test devices (e.g., caller ID block or enablement). The call feature manager 150 may be configured to receive the request from the mobile communication device 102, and configure and/or setup elements of the network under test such that the feature action is activated on the network under test. Thus, with the feature action configured, the test application 142 may identify whether the test device confirms that the mobile communication device 102 caller identification visibility is blocked. In some embodiments, the variety of call sequences, feature actions, predefined functions, and associated information and/or results may be collectively referred to as any of a test, test scenario, or call scenario.

In some embodiments, the testing application 142 may be configured to perform cyclical functions or sequential operations, hold a call for a definable duration (e.g., a preset or inputted amount of time before proceeding), and/or lookup validation information associating with expected results from test activities. The testing application 142 may continuously run call scenarios in a random and/or sequential order that may be drawn from information stored in a storage (e.g., test storage 162). It is also understood that a testing application 142 may use a script to implement processes for a variety of testing scenarios.

In some contexts, the testing application 142 may execute operations (e.g., call sequences, testing scenarios, etc.) sequentially, which may be based on confirmation and/or verification of a prior operation being performed. In some embodiments, confirmations and/or verifications of an operation may include an application (e.g., testing application 142) using call detail record captures (occasionally referenced as CDR captures), which may be based on identifying combinations of feature actions, call scenarios, and/or predefined functions. It is understood that a CDR capture is not limited to identifying only information within call detail records (i.e. records that are processed), but may also include raw call detail records and/or other embodiments of raw call detail records as described hereafter. In some embodiments, an application may command verification of information from CDR captures, such as a call, call sequence, testing scenario (i.e., call scenario), feature action, and/or predefined functions by accessing information on an element of the network 120, and/or a storage that is communicatively linked. In some embodiments, a CDR capture may include searching an element of the network 120 (e.g., a network switch where a raw call detail record may be created) for a specific string sequence in order to confirm and/or verify that a requested operation (i.e., a call, call sequence, testing scenario, etc.) was performed or not performed.

In an embodiment, the system 100 includes the test storage 162 that may be communicatively coupled with the computer 140 via a direct link and/or be accessible via the network 120. The test storage 162 may comprise a non-transitory memory that includes input and output data information associated with the testing application 142. In some embodiments, the test storage 162 may comprise any of input data, scripts, types of calls, sequence of feature actions, testing scenarios, expected results, histories of completed test scenarios, captured confirmations, communication logs, test settings, test results, available test devices, test device control information, raw call detail record confirmations, and/or other information associated with automated testing using testing application 142.

In some contexts, the test storage 162 may comprise a plurality of expected results that collectively may be referred to as a baseline. In an embodiment, expected results may allow a communication service provider to compare any of information, confirmations, and/or results from one test scenario with prior test scenarios that may act as an expected result. Thus, when a communication service provider implements a change to the network under test—such as reconfiguring a subset of the radio access network—then variations and/or irregularities in the results received from a test and/or confirmations from a test may be more readily identified when compared against the baseline. In an embodiment, an application (e.g., testing application 142) may determine whether results from a test scenario do not match a baseline, and/or exceed a predefined deviation from a baseline. In this embodiment, confirmation that the received results and baseline metric does or does not match, and/or does or does not exceed a predefined deviation may trigger execution of another operation (e.g., a predefined function, terminating a call, placing another call, implementing another test scenario). In some embodiments, it may be efficient for a test scenario to terminate when erroneous results (e.g., results not matching expected results or a baseline metric) are identified, before the end of the test scenario or before the end of the entire call flow sequence, instead of waiting for the entire scenario to finish its planned call scenario. If a test result is determined to be erroneous in the middle of the test scenario or in the middle of the planned call sequence, that test scenario may be terminated and another test scenario may be initiated.

The system 100 may also comprise at least one raw call detail record (CDR) storage 160. In some embodiments, a raw CDR storage 160 may be located on, or communicatively coupled with, a telecommunications element, such as a switch of network 120. Stated another way, a telecommunications element, such as a switch, may be configured as and/or include a raw CDR storage 160, and thus a separate storage device would not be required for storing raw call detail records (which are described in FIG. 1*b*). Alternatively, a raw CDR storage 160 may exist as a standalone storage element that may be accessed via the network 120 or via a direct connection, such as connection with a switch. As described below in FIG. 1*b*, a raw CDR storage 160 may comprise a raw call detail record, which is further explained by referring to the exemplary embodiment disclosed in FIG. 1*b*. Additionally, FIG. 1*a* discloses a mediation platform 170 that is communicatively coupled with a billing server 174. The illustrated embodiment shows billing server 174 being coupled to network 120 via mediation platform 170; however, it is understood that billing server 174 may be coupled with network 120 directly. For clarity, the role of a mediation platform 170 and billing server 174 is discussed in FIG. 1*b*.

Figure 1B:
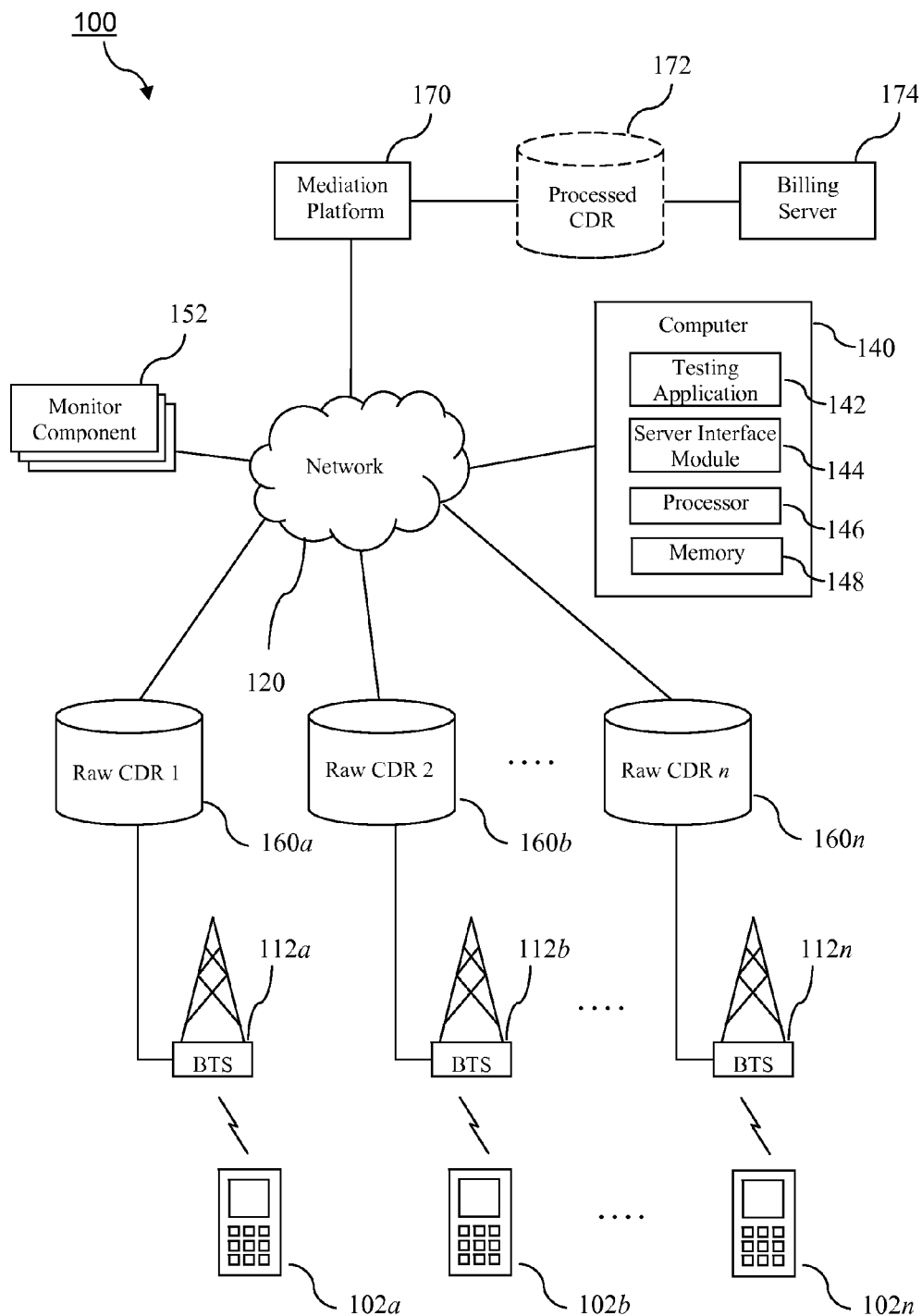
FIG. 1b is an exemplary schematic of the communication system of FIG. 1a according to an embodiment of the disclosure.

Turning now to FIG. 1*b*, an exemplary schematic of system 100 is disclosed. In an embodiment, a plurality of raw CDRs 160*a-n*, base transceiver stations 112*a-n*, mobile communication devices 102*a-n*, monitor components 152, and a computer 140 may be communicatively coupled via the network 120. The system 100 may also comprise a mediation platform 170, a processed CDR 172, and a billing server 174 that may be communicatively coupled with each other and to the network 120. In an embodiment, elements of the network 120 and/or radio access network create a plurality of raw call detail records 160*a-n* that are associated with a call, where the raw detail records 160*a-n* may be stored on at least one storage, e.g. raw CDR storage 160. Similarly, a plurality of processed call detail records 172 may exist on a storage—referred to as a processed call detail record storage—which may be communicatively connected with any of the mediation platform 170, network 120, and/or billing server 174. Although exemplified in FIG. 1*b* as being configured after a mediation platform 170, in some embodiments, a processed CDR 172 may exist before reaching a mediation platform 170. In these embodiments, the processed CDR 172 may refer to a plurality of associated raw call detail records 160*a-n* being combined together and/or processed by elements of the network 120 prior to reaching the mediation platform 170 and/or prior to being processed by the mediation platform 170. As illustrated in FIG. 1*b*, processed CDR 172 is shown as a dashed-line element to exemplify that call detail records are processed when coming from a mediation platform 170 and usable by a billing server 174; thus, while a processed CDR 172 may exist on a separate storage element, a processed CDR 172 may also exist in a mediation platform 170 and/or a billing server 174.

It is understood that data and/or information from raw call detail records may eventually transform (e.g., by altering the content of the original raw CDR) and migrate to billing servers that are accessible for billing clients of the communication service provider. To understand the temporal aspect of when an application (e.g., the testing application 142) commands, monitors, accesses, and/or inspects information while conducting a test scenario, the following example discloses one embodiment of a life cycle of a typical call detail record. By way of example, when the mobile communication device 102a originates a call to mobile communication device 102b via base transceiver stations 112a-b of the radio access network, radio access network elements (i.e., apparatus' known to be used in the functionality of the radio access network) may begin creating raw CDR1 160a and raw CDR2 160b that are both associated with the call. In some embodiments, CDR1 160a and CDR2 160b may be stored on a storage local to the radio access network element creating the raw call detail records. While the mobile communication devices 102a-b continue engagement of the call, their respective raw CDRs 160a-b will continue to be created and may exist as a data file. Upon termination of the call or execution of a predefined function, each raw CDR 160a-b may exist on a storage for a predefined time before going into a mediation process.

It is understood in the telecommunications industry that the mediation process may be performed by a mediation platform 170, which operates as intermediary between network elements that generate the raw call detail records and a billing server 174 or other down-stream applications. By way of example, the mediation process of the mediation platform 170 may comprise functionalities including any of collecting, segregating, formatting, preprocessing (such as cleaning), post processing (such as any of filtering, converting, aggregating, or correlating), transforming, converting, and distributing raw call detail records 160a-n into a format, form, and state acceptable by down-stream systems, such as a billing server 174. The billing server 174 may then use the processed call detail record 172 for a variety of functions (e.g., billing clients) because, unlike a raw CDR 160a-n, the processed call detail record 172 may be in a form more easily accessible for viewing and understanding by downstream parties and/or applications.

In the telecommunications industry, it is understood that the term call detail record (occasionally referred to hereafter as CDR) typically refers to a record of a call that has been processed and/or has undergone a mediation process for use by a billing server because the contents of the call detail record are in a form more easily readable and understandable for parties and/or applications. In some embodiments, a call detail record—including a raw call detail record and a processed call detail record 172—may comprise data and information associated with calls from a communication device; however, the scope, form, state, breadth, and nature of data and information within the record may vary dependent on the call detail record type, i.e. raw call detail records 160a-n and processed call detail records 172 may not be in the same state nor contain the same information. In some embodiments, raw call detail records 160a-n may include a data element that may comprise any of a data file or live data stream. In some embodiments, a live data stream may be referred to as being in progress, thereby indicating that a raw call detail record is in the process of being created and data is continuing to be added. Examples of a data element (e.g., data and information associated with calls that may be live and/or in progress) include any of the phone number of the device originating and/or receiving the call, feature activation, date and time of call initiation, call duration, call status, device equipment identification, call disposition (such as whether call is answered, terminated), call type, call route, network hop of call, or other metadata associated with the call.

A processed call detail record 172 (colloquially known as a call detail record) may be a call detail record that has been processed or is being processed for use by a downstream client (e.g., a billing server 174). It is generally understood in the telecommunications industry that a mediation process may feature collection, validation, transformation, distribution, and processing of raw call detail records 160a-n. In an embodiment, a processed call detail record 172 results from mediation processing of a plurality of raw call detail records 160a-n. It is understood that a processed call detail record 172 is not a raw call detail record 160a-n. Comparatively, in an embodiment, a raw call detail record 160a-n is unprocessed and thus is not collected, validated, transformed, pre-processed, or distributed (such as by a mediation platform 170) because it has yet to take steps toward, or begin a mediation process. In an embodiment, a raw call detail record 160a-n may be described as being unprocessed by a mediation platform 170. In some embodiments, the raw call detail record 160a-n may be referred to as an unfinished call detail record, unprocessed, in a native state, incomplete, open, or is in-progress because, for example, it has not been transformed into a form that may be suitable for billing by the communication service provider. In an embodiment, the raw call detail record 160a-n may be referred to as being in a native state, and may be such that each raw call detail record 160a-n has not been transformed or engaged in a mediation process.

In an embodiment, a processed call detail record 172 may be based on information extracted and/or obtained from a plurality of raw call detail records 160a-n. Conversely, in an embodiment, each raw call detail record 160a-n may include information based on and/or associated with one aspect of call, test device, or feature action that is unique and exists separate from other related raw call detail records 160a-n.

It is understood that in a given test scenario, the number of raw call detail records 160a-n may not match the number of test devices included in the network under test, yet may still lead to one processed CDR 172 that includes information from the plurality of raw call detail records 160a-n. It is also understood that a plurality of raw call detail records 160a-n may exist on different elements of the network 120 or other storages accessible for retrieval. For example, a test scenario with mobile communication device 102a calling mobile communication device 102b may generate two raw call detail records 160a and 160b respectively; however, a test scenario with a call activating a feature action that uses a predefined function for a multi-party connection of three mobile communication devices may generate and associate with five raw call detail records. In some embodiments, confirmation and verification of information within a plurality of raw call detail records 160a-n may require an application (e.g., testing application 142) and/or a component (e.g., a monitor component 152) to access, search, and compare with known information (i.e., expected results and/or a baseline metric). Both test scenarios described may each result in one processed CDR 172 via a mediation process by the mediation platform 170.

Although information from a processed CDR 172 may be accessible to the testing application 142, the mediation process often takes time to complete, and thus may increase the overall time for completing testing call scenarios. In some embodiments, the testing application 142 may increase efficiency by not waiting for the raw call detail records 160*a-n* to become a processed CDR 172, but instead may access the contents of raw call detail records 160*a-n* during creation, as the call scenario is in progress, and/or before processing. By accessing a raw call detail record 160*a-n*, the testing application 142 may monitor the data elements, such as incoming streaming live feed and data files, from the mobile communication devices 102*a-n* without the added time of waiting for the mediation process (e.g., by a mediation platform 170).

In an embodiment, a testing scenario of the testing application 142 may compare and/or confirm that a processed CDR 172 reflects occurrence of information from any of raw CDRs 160*a-n*, such as any of call origination, call connection, activation of feature action, or occurrence of predefined function of the feature action. Another embodiment may also compare and/or confirm the information of one raw call detail record 160*a-n* with any of another raw call detail record 160*a-n*, a communication log, a baseline result (e.g., an expected result, and/or a baseline metric), or a processed CDR 172. For example, a testing application 142 may monitor the respective communication logs of mobile communication devices 102*a* and 102*b* by accessing, inspecting, and confirming information obtained from each communication log, which is then compared with information from the respective raw CDR 1 160*a*, raw CDR 2 160*b*, and an expected result. In some embodiments, multiple raw call detail records may be associated with one communication device (e.g. mobile communication device 102*a* may associate with a plurality of raw CDRs a-n upon occurrence of a predefined function).

In an embodiment, monitoring of communication logs, raw CDRs, processed CDRs, and/or expected results may occur by using a monitor component 152. The monitor component 152 may be any type of processor-based platform that operates on any suitable operating system, and is coupled with a storage (e.g., a raw call detail record storage 160, or test storage 163) that may be accessible via the network 120. In another embodiment, the monitor component 152 may exist on a network 120 element, and/or a radio access network element that is communicatively coupled with any of the network 120, storages of raw call detail records 160*a-n*, or the testing application 142 of the computer 140. The monitor component 152 may communicate with the testing application 142 to execute logic for retrieving, monitoring, accessing, inspecting, or capturing information associated with and/or existing on any of a raw call detail storage 160, mobile communication device 102, or communication device 130. The monitor component 152 may relay to a testing application 142 any of confirmations, activations, deactivations, call state, call control, access, or capturing of communication logs.

In an embodiment, monitoring a plurality of raw call detail records 160*a-n* on the network 120 may be described as occurring contemporaneously with a call. It is understood that monitoring occurring contemporaneously may refer to a testing application 142 and/or monitor component 152 accessing at least one raw call detail record while a call is in progress. In some embodiments, contemporaneous may refer to accessing at least one raw call detail record while the raw call detail record is being created and while the call is ongoing. In some embodiments, monitoring may be an in-situ operation (i.e., an operation that does not disturb the native state of the information and/or record being monitored). In some embodiments, an in-situ operation of accessing, inspecting, and/or capturing a raw CDR 160*a-n* may not occur while a call is in progress. It is understood that the exemplary disclosure of FIG. 1*b* may be implemented with the embodiments previously described in FIG. 1*a*.

Figure 2:
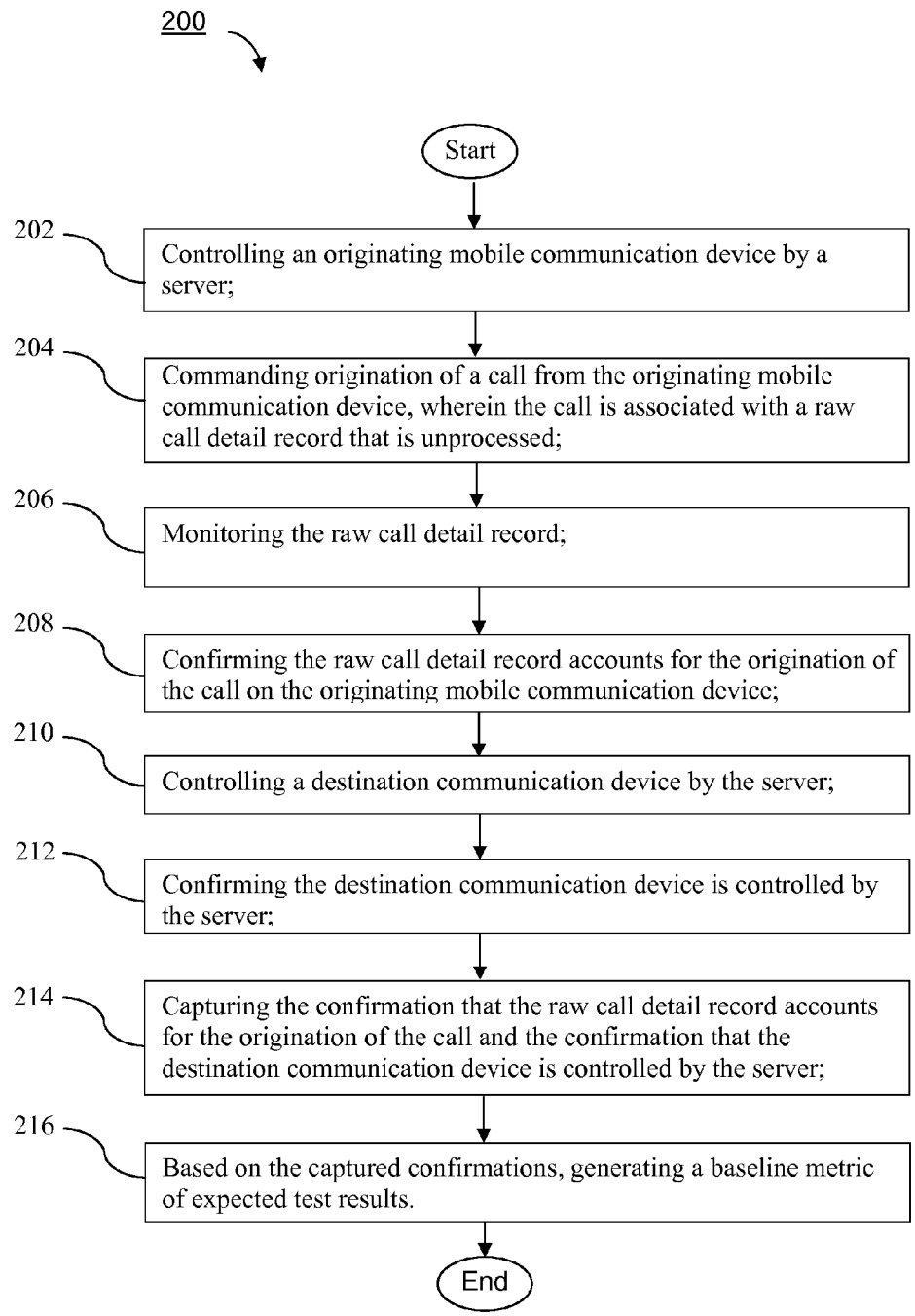
FIG. 2 is a flowchart illustrating a method according to a disclosed embodiment.

Turning now to FIG. 2, a flowchart illustrating an embodiment of a computer-implemented method 200 of automated testing of a network is disclosed. Initially in this embodiment, an originating communication device is controlled 202. The originating communication device may be any of a mobile communication device, a landline communication device, and/or a virtual communication device. Embodiments of communication devices are disclosed above in FIGS. 1*a* and 1*b*. In some contexts, control 202 of an originating communication device occurs by a server, an application, or module—any of which may be communicatively coupled via a direct link or via a network—that is configured to execute logic that operates and uses the functionality of the communication device. In an embodiment, control is accomplished by a testing application executing on a computer. In some contexts API's of the communication device are used for control purposes, such as placing calls, receiving calls, and/or performing predefined functions previously described above.

Continuing with the present embodiment, the method 200 also comprises commanding 204 origination of a call from the originating communication device. Embodiments of a call may include any of a voice call, a data call (e.g., a video call or data transfer), an SMS, or an MMS. The call may be associated with any of a raw call detail record or a communication log (e.g., logs of the originating communication device or a destination communication device). Embodiments of a raw call detail record may include any of being unprocessed (e.g., a call detail record not processed by a mediation platform), being in a native state, being an unfinished call detail record, being an open call detail record, being in-progress, being created, and as otherwise previously disclosed. The raw call detail record may include a data element. A data element may comprise any of a data file or a live data stream which may be in-progress. In an embodiment, an in-progress live data stream refers to data and/or information being actively recorded due to an ongoing call between a plurality of communication devices. In some embodiments, commanding origination of a call triggers the generation of a communication log. The generation of a communication may occur via an application (e.g., an OEM communication application, or a testing application executing on a server). Embodiments of communication logs are described above in FIGS. 1*a* and 1*b*.

In this embodiment, the method 200 includes monitoring 206 the raw call detail record. Monitoring 206 the raw call detail record may include accessing a data element of the raw call detail record, inspecting the data element, and maintaining the raw call detail record's present state. Alternative embodiments of the monitoring 206 step may include controlling a monitor component, commanding access of the raw call detail record on a storage, and inspecting the raw call detail record. In some embodiments, inspecting and maintaining the raw call detail record's present state may be performed and referred to as an in-situ operation, which is previously described above. Accessing the data element of the raw call detail record may occur as the raw call detail record is being created (i.e., while a communication device is actively engaged in a call). In some embodiments, accessing the raw call detail record—including elements therein—may occur by a monitor component as previously described.

The method 200 may also comprise the step of confirming 208 the raw call detail record accounts for the origination of the call on the originating mobile communication device. In some embodiments, origination of the call on the originating mobile communication device may also be confirmed on a communication log which may be associated with the originating mobile communication device. Confirming the raw call detail record accounts for the origination of the call on the originating mobile communication device may include any of accessing information (e.g., a data element) of the raw call detail record, inspecting the information, comparing the information (e.g., with an expected result, baseline metric, other raw call detail records, and/or communication logs), and/or maintaining the raw call detail record's present state. In some embodiments, confirmations of the raw call detail record may occur by a monitor component, and/or application. Similarly, confirming a communication log accounts for the origination of a call may include any of accessing information of the communication log (e.g., information displayed on a screen of the communication device), parsing the information from the communication log, inspecting the information, comparing the information (e.g., with an expected result, baseline metric, other raw call detail records, and/or communication logs), and/or maintaining the communication log's present state. In some embodiments, confirmations of a communication log may occur by accessing API's on the communication device.

The method 200 may also comprise controlling 210 a destination communication device. It is understood that a destination communication device may comprise a communication, such as a mobile communication device, landline phone, and/or a virtual communication device. The control 210 may occur using a server and/or elements therein. It is understood that control 210 of the destination communication device may occur in the same or similar manner as the control of the originating mobile communication device. That is, an application may command functional control of the destination communication device thereby configuring the destination communication device to execute a sequence of predefined functions. The method 200 may also confirm 212 that the destination communication device is controlled by the server. In an embodiment, confirmation that the destination communication device is controlled by the server may occur by an application and/or monitor component using API's to access communication logs, analyze, and verify that control of the communication device has occurred. Confirmation that control has occurred may include verifying that an application may execute a predefined function which is reflected in the communication log.

The method 200 may also include capturing 214 the confirmation that the raw call detail record accounts for the origination of the call and the confirmation that the destination communication device is controlled by the server. As described in the embodiment above in FIG. 1a regarding CDR capture, an application may verify that a predefined function may be executed on each respectively controlled device (i.e., the originating and destination communication device). In some embodiments, confirming and/or capturing a confirmation that a raw call detail record accounts for a specific piece of information may include accessing and inspecting a data element, and then comparing the data element with an expected result. It is understood that a raw call detail record may be located on an element of the network, such as a storage or switch.

Some embodiments of accessing, inspecting, and comparing a data element may include an application using any of an identification number, name, internet protocol address, method of access (e.g. secure shell), and/or authentication information of the element or storage that includes the raw call detail record. In some embodiments, monitoring of raw call detail records may use disclosed embodiments for accessing, inspecting, and comparing a data element. In an embodiment, the method 200 may include logging and/or recording the captured confirmations in a storage (e.g., a test storage that is communicatively linked to the controlling application and/or controlling server). The method 200 may include generating 216 a baseline metric of expected test results based on captured confirmations, such as a generated confirmation that the raw call detail record accounts for the origination of the call and/or the a generated confirmation that the destination communication device is controlled by the server. Generation of a baseline metric may include and/or be associated with at least one data element of at least one raw call detail record. A baseline metric may include embodiments of expected results (i.e., expected test results) discussed previously.

In this embodiment, the method 200 may also include a step subsequent to confirmation that the raw call detail record accounts for the origination of the call and the confirmation that the destination communication device is controlled by the server; the step including commanding (e.g., by the server and/or an application) termination of the call from the originating mobile communication device. It is understood that the disclosed embodiments may be implemented by an application architecture, such as test software architecture environment later disclosed in FIG. 6C.

Figure 3:
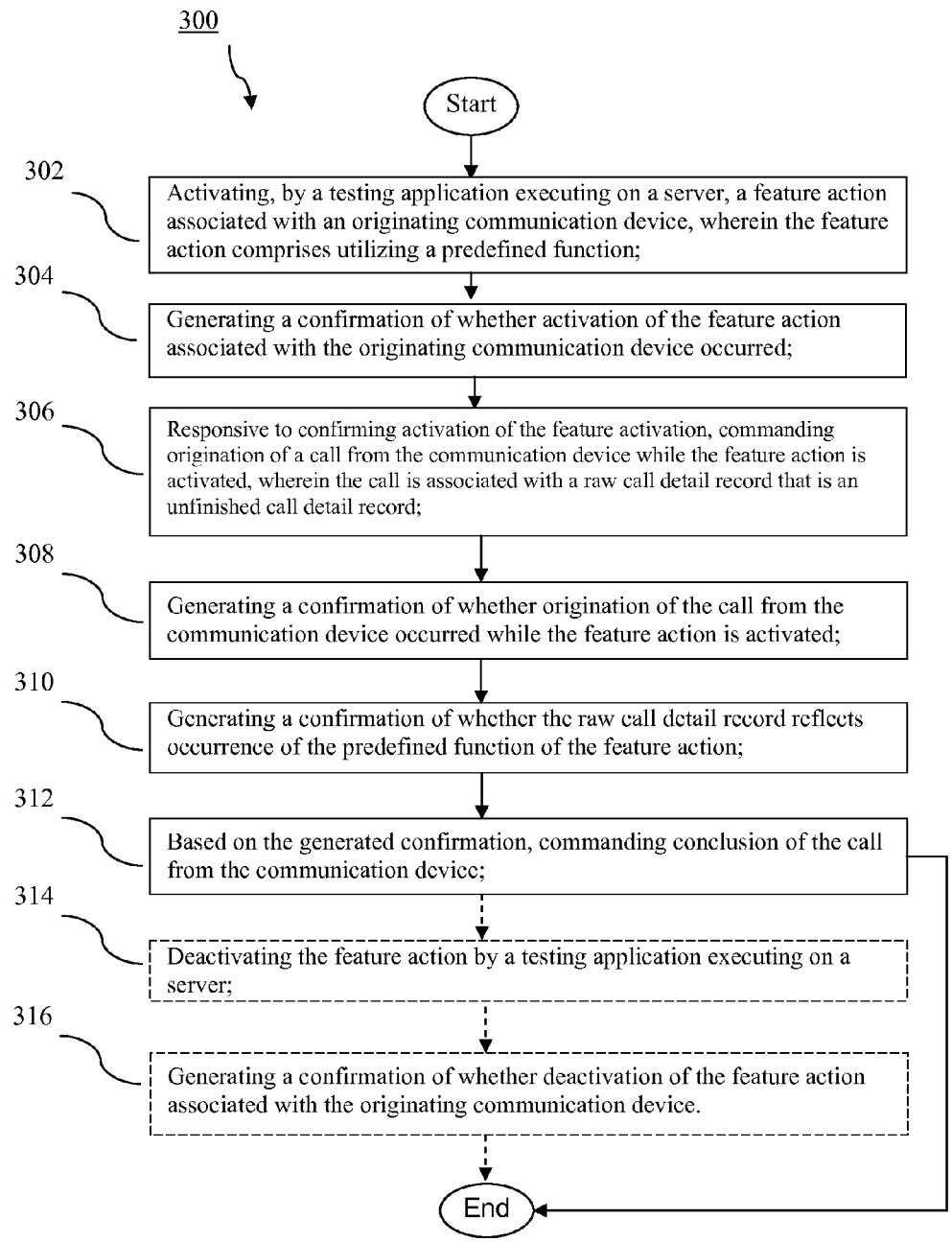
FIG. 3 is a flowchart illustration of another method according to a disclosed embodiment.

Turning now to FIG. 3, a flowchart illustration according to an embodied method 300 of the present disclosure is shown. The computer-implemented method 300 of automated testing of a network may comprise a step of activating 302, by a testing application executing on a server, a feature action associated with an originating communication device. To avoid repetition, it is understood that embodiments of a testing application and communication device may include the disclosed embodiments of at least FIG. 1a and FIG. 1b. The testing application may order a call sequence that tests the functionality of the network, such as provisioning a feature action that uses a predefined function. Embodiments of the feature actions using predefined functions are disclosed above, including at least in FIGS. 1a and 1b. Similarly, embodiments of a call are previously disclosed above.

The method 300 may also comprise generation 304 of a confirmation of whether activation of the feature action associated with the originating communication device occurred. It is understood that a generated confirmation (e.g., the confirmation of 304) may include a positive or negative response, such as confirming that a feature action was or was not activated. In some embodiments, subsequent steps (e.g., steps of method 300) may occur based on a generated confirmation. In some embodiments, an application, for example, may generate a confirmation by referring to a communication log and/or raw call detail record (e.g., by CDR capture) as disclosed in previous embodiments, including at least FIGS. 1a and 1b. The method 300 may also include commanding 306 origination of a call from the originating communication device while the feature action is activated. Commanding 306 origination of a call may be responsive to confirming activation of a feature action (e.g., a feature action was or was not activated). In an embodiment, the call is associated with a raw call detail record, which may be an unfinished call detail record. It is understood that alternative embodiments of describing a raw call detail record are previously disclosed above. For example, the raw call detail record may include a data element that may comprise a data file and/or live data stream that may be in progress such that a test scenario is active. In some embodiments, commanding 306 origination of a call may be implemented by an application (e.g., a testing application disclosed in at least FIGS. 1a and/or 1b). The method 300 may include accessing the raw call detail record as the raw call detail record is being created—that is, before it is processed, such as by a mediation platform.

The method 300 may also comprise generating 308 a confirmation of whether origination of the call from the originating communication device occurred while the feature action is activated. Similarly, a confirmation may be generated 310 of whether the raw call detail record reflects occurrence of the predefined function of the feature action. In an embodiment, generating 308 a confirmation and/or confirming the raw call detail record may comprise accessing a data element of the raw call detail record, inspecting the data element, comparing the data element with an expected result, and maintaining the raw call detail record in a present and/or native state. In an embodiment, accessing the data element of the raw call detail record may occur as the raw call detail record is being created.

Figure 6A:
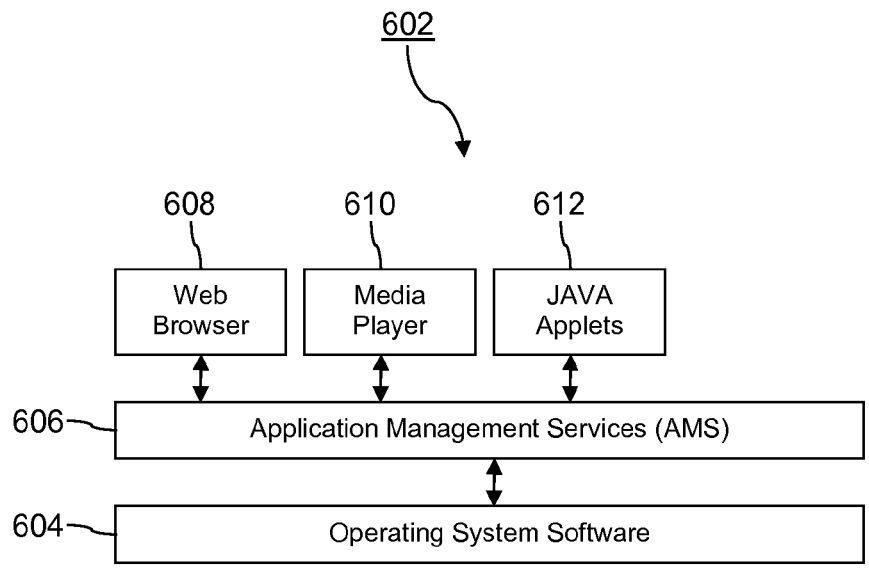
FIG. 6a is a block diagram of a software architecture of a mobile communication device according to an embodiment of the disclosure.
Figure 6B:
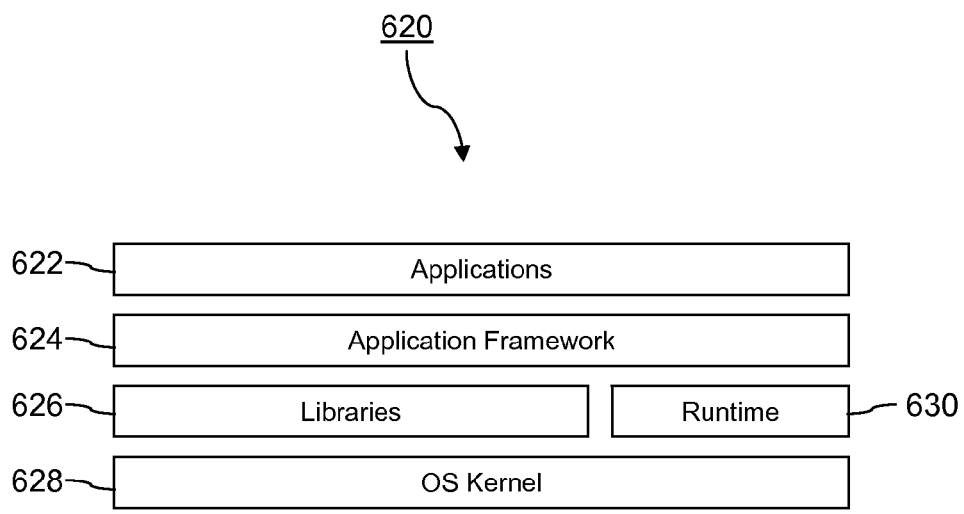
FIG. 6b is a block diagram of another software architecture of a mobile communication device according to an embodiment of the disclosure.
Figure 6C:
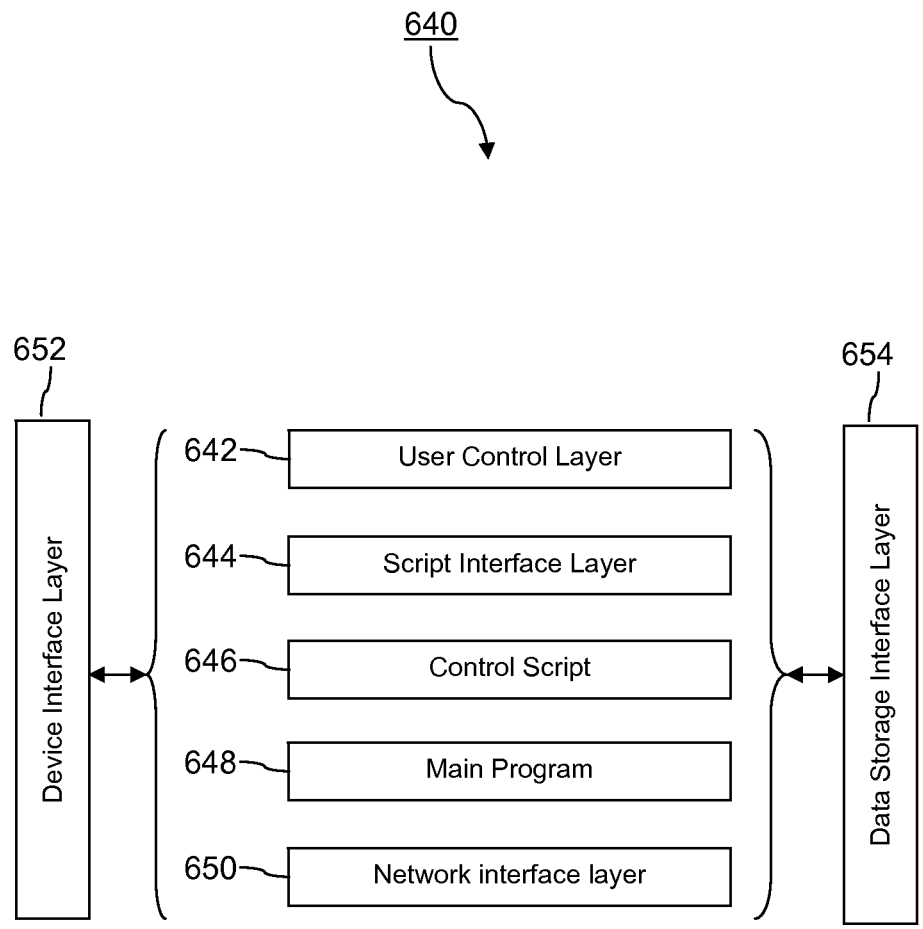
FIG. 6c is a block diagram illustrating an exemplary software architecture suitable for implementing the several embodiments of the disclosure.

It is understood that confirming origination of the call (e.g., if the call did or did not originate) and/or confirming the raw call detail record may be implemented according to previously disclosed embodiments, including at least FIG. 1a, FIG. 2, and/or FIG. 6C. It is understood that an application, for example, may generate a plurality of confirmations, where each confirmation may be associated and/or based on a positive and/or negative result. For example, a test scenario may include activating call blocking on a destination mobile communication device; however, when an application requests confirmation that the destination mobile communication was provisioned with call blocking features, a generated confirmation of the call blocking activation shows that the destination mobile communication device was not provisioned with the requested feature activation of call blocking. In some embodiments, a testing application may recognize that there is an error in the generated test confirmation and thus cancel the remaining portion of a planned test scenario, and thus may move on to another test scenario or may alert a network administrator that an error was found.

In an embodiment, method 300 may comprise any of capturing the confirmation of activating the feature action on the originating communication device, capturing a confirmation that an action was initiated from the originating communication while the feature action is active (e.g., an action of origination of a call from the communication device), and/or capturing the confirmation that the raw call detail record reflects occurrence of the predefined function of the feature action. In an embodiment, capturing information and/or confirmations may include parsing information from a screen of a communication device. Alternative embodiments for capture may comprise those previously disclosed in at least FIGS. 1a and 1b.

In some embodiments, method 300 may include commanding 312 conclusion and/or termination of the call from the originating communication device. It is understood that commanding conclusion may be from an application executing command instructions. In, an embodiment, commanding 312 may occur subsequent to and/or based on another action, such as based on a generated confirmation. For example, a generated confirmation may show that a raw call detail record does or does not reflect occurrence of a predefined function of a feature action. The method 300 may also comprise deactivating 314 one or more feature actions by, for example, a testing application executing on a server. The method 300 may also comprise generating 316 a confirmation of whether deactivation of the feature action associated with the originating communication device occurred. In some embodiments, deactivation and confirmation of deactivation may occur by provisioning a communication device and/or elements of a network. The method 300 may also include logging captured confirmations (e.g., storing generated confirmations) in a storage. Additionally, the method 300 may include determining a subsequent feature action to activate that uses a predefined function. In some embodiments, the subsequent feature action that is activated may be the same as the feature action currently active, except the subsequent feature action is activated on a communication device other than the originating communication device. In an embodiment, a plurality of communication devices may each have at least one feature action activated at the same time. An alternative embodiment may include a subsequent feature action on one communication device (e.g., the originating communication device) being activated based on the deactivation of a prior feature action and/or based on occurrence of another step and/or results from a previous step. In some embodiments, determination and activation of feature actions may be responsive to logging captured confirmations in a storage. Additionally, some embodiments of method 300 may include a step of generating a baseline metric of test results, and generation of a baseline metric may be based on captured confirmations. As previously mentioned above, embodiments of a baseline metric may include association with expected results from a test case and/or test scenario, and/or a subset of results from a test scenario.

Figure 4:
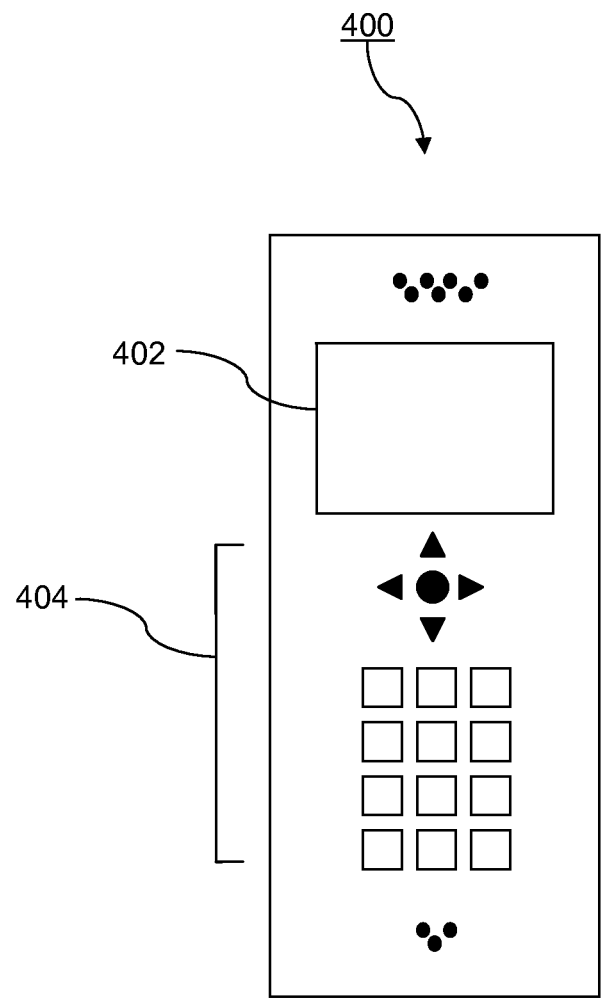
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

FIG. 6C illustrates a test software architecture environment 640 suitable for implementing one or more embodiments disclosed herein. A processor may execute a main program 648 that may serve as a platform from which the rest of the software architecture operates. The main program 648 may perform logic of test scenarios (i.e., as discussed in embodiments above) by invoking commands that may interface with a test device and/or network element in a predefined and/or programmed sequence. The main program 648 may also comprise the computer-implemented code segments that are configured to communicate with a test device and a network under test. In some embodiments, the main program 648 may receive and/or retrieve information from a test device, components (e.g., monitor component), and/or network elements in real time for processing, manipulation, and/or storage. It is understood that real time processing may include processing information while a test scenario is active. The test software architecture 640 may also include a user control layer 642 that comprises an interface between the user and the software. In an embodiment, the user control layer 642 may be implemented using a graphical user interface (GUI) and/or Command Line Interface (CLI) where a user input may specify test information. Results from a test scenario may also be displayed on a screen by using the GUI.

In some embodiments, the test software architecture environment 640 may comprise a script interface layer 644. The script interface layer 644 may allow the main program 648 to instruct the control script 646 to initiate operation. The control script 646 may include instruction segments that process a user inputted data for running a suite of test scenarios, and may be implemented for the duration of the test scenario. The test software architecture environment 640 may also comprise a network interface layer 650, a device interface layer 652, and a data storage interface layer 654. The network interface layer 650 may include an application programming interface (API) that may be used to communicate with a network element that may be used in a test scenario. The device interface layer 652 may include an API that may be used to communicate with test devices (e.g. communication device, mobile communication device, or emulated device). The data storage interface layer 654 may include an API that may be used to communicate with a storage for storing input and output data. It is understood that a storage may be communicatively coupled on a local computer or remotely via a network. It is understood that elements (e.g., layers, scripts, and programs) of the test software architecture environment 640 may interact and/or communicate with each other, and/or with external applications, devices, storages, and/or networks.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of transceivers, radio transceivers, modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), integrated digital enhanced network (iDEN), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts,—such as the secondary storage 384, the ROM 386, and the RAM 388—storage may be referred to as a non-transitory computer readable medium, a non-transitory memory, or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Unless specifically stated otherwise as apparent from the above discussion, it is appreciated that throughout the description, discussions using terms such as analyzing or processing or confirming or verifying or logging or activating or computing or calculating or determining or displaying or the like, refer to the action and processes of a computer system, or similar electronic computing device, that manipulates and transforms data represented as physical (electronic) quantities within the computer system memories or registers or other such information storage, transmission or display devices.

Embodiments of the present disclosure have been described in particular detail with respect to one possible embodiment. Those of skill in the art will appreciate that the disclosure may be practiced in other embodiments. First, the particular naming of the components, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the present disclosure are not described with reference to any particular programming language. It is appreciated that a variety of programming languages may be used to implement the teachings of the present disclosure as described herein, and any references to specific languages are provided for disclosure of enablement and best mode of the present disclosure. Embodiments of the present disclosure are well suited to a wide variety of computer network systems over numerous topologies. Within this field, the configuration and management of large networks comprise storage devices and computers that are communicatively coupled to dissimilar computers and storage devices over a network, such as the Internet.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented method of automated testing of a network, comprising:
controlling an originating mobile communication device by a server;
commanding origination of a call from the originating mobile communication device to a destination communication device,
wherein the call is associated with a raw call detail record that is unprocessed;
monitoring the raw call detail record on a raw call detail record storage;
confirming the raw call detail record accounts for the origination of the call on the originating mobile communication device;

controlling the destination communication device by the server;

confirming the destination communication device is controlled by the server based on a communication log of the destination communication device;

capturing the confirmation, from the raw call detail record storage, that the raw call detail record accounts for the origination of the call, and the confirmation, from the communication log of the destination communication device, that the destination communication device is controlled by the server; and based on analysis of the captured confirmations, generating a baseline metric of expected test results.

2. The method of claim 1, further comprising:

accessing the raw call detail record as the raw call detail record is being created on the raw call detail record storage; and subsequent to confirmation that the raw call detail record accounts for the origination of the call and the confirmation that the destination communication device is controlled by the server, commanding termination of the call from the originating mobile communication device.

3. The method of claim 1, wherein the raw call detail record includes a data element,
  wherein the data element comprises any of a data file or a live data stream, and wherein monitoring the raw call detail record comprises,
  accessing the data element of the raw call detail record on the raw call detail record storage,
  inspecting the data element of the raw call detail record, and
  maintaining the raw call detail record's present state,
wherein the baseline metric of expected test results includes at least one data element of at least one raw call detail record.

4. The method of claim 3, wherein data element is a live data stream and the live data stream is in progress, and wherein accessing the data element of the raw call detail record occurs as the raw call detail record is being created on the raw call detail record storage.

5. The method of claim 1, further comprising:

confirming the originating mobile communication device is controlled by the server based on an originating mobile communication device communication log; and capturing the confirmation from the originating mobile communication device communication log that the originating mobile communication device is controlled by the server.

6. The method of claim 1, wherein the raw call detail record is in a native state.

7. The method of claim 1, wherein the call from the originating mobile communication device includes any of a voice call, a data call, a short message service (SMS), or a multimedia message service (MMS).

8. A computer-implemented method of automated testing of a network comprising:

activating, by a testing application executing on a computer, a feature action associated with configuration of the network, wherein the feature action comprises using a predefined function;

generating a confirmation of activation of the feature action;

responsive to confirming activation of the feature action, commanding origination of a call from an originating communication device while the feature action is activated,
  wherein the call is associated with a raw call detail record that is an unfinished call detail record;

generating a confirmation of origination of the call from the originating communication device while the feature action is activated based on a communication log of the originating communication device;

generating a confirmation that the raw call detail record reflects occurrence of the predefined function of the feature action; and based on the generated confirmations, commanding conclusion of the call from the originating communication device.

9. The method of claim 8, further comprising:

capturing the confirmation of activating the feature action, the confirmation of origination of the call from the originating communication device while the feature action is activated, and the confirmation that the raw call detail record reflects occurrence of the predefined function of the feature action;

based on analyzing the captured confirmations, deactivating the feature action associated with the network by a testing application executing on a server;

generating a confirmation of deactivation of the feature action associated with the network;

logging captured confirmations in a storage; and based on captured confirmations logged in the storage, generating a baseline metric of test results.

10. The method of claim 8, further comprising:

accessing the raw call detail record as the raw call detail record is being created on a raw call detail record storage.

11. The method of claim 8, wherein the raw call detail record includes a data element,
  wherein the data element comprises any of a data file or a live data stream, and wherein generating a confirmation that the raw call detail record reflects occurrence of the predefined function of the feature action comprises,
  accessing the data element of the raw call detail record on the raw call detail record storage,
  inspecting the data element of the raw call detail record,
  comparing the data element of the raw call detail record with an expected result, and
  maintaining the raw call detail record's present state.

12. The method of claim 11, wherein the data element is a live data stream and the live data stream is in progress, and wherein accessing the data element of the raw call detail record occurs as the raw call detail record is being created on a raw call detail record storage.

13. The method of claim 8, wherein the predefined function comprises any of call forwarding, call waiting, call transfer, a multiparty call, information retrieval, identification visibility, assistance, or bill payment.

14. The method of claim 8, wherein the call from the originating communication device includes any of a voice call, a data call, a short message service (SMS), or a multimedia message service (MMS).

15. A system for automated testing of a network comprising, at least one communication device, including
  a processor,
  a non-transitory memory,
  a communication module that communicatively couples the communication device with a computer,
  a control interface module that is configured for controlling functionality of the communication device, a communication application stored in the non-transitory memory that is configured to generate a communication log associated with the communication device;

a raw call detail record storage that is a non-transitory memory comprising a plurality of raw call detail records;

a test storage that is a non-transitory memory comprising:
a plurality of expected communication log results, and
a plurality of expected raw call detail record results;

a monitor component configured to access and inspect the raw call detail records via the network; and a computer including, a processor, a non-transitory memory, and a testing application stored in the non-transitory memory that, when executed by the processor, causes the processor to perform operations comprising:
controlling the communication device,
commanding origination of a call from the mobile communication device,
wherein the origination of the call triggers the communication application of the communication device to generate a communication log,
wherein the call is associated with both the communication log of the communication device and a raw call detail record,
monitoring the communication log associated with the call of a communication device,
monitoring the raw call detail record that is in a native state on the raw call detail record storage,
confirming the communication log and raw call detail record accounts for the origination of the call,
determining whether the confirmation of the communication log and raw call detail record respectively match an expected communication log result and an expected raw call detail record result,
responsive to a determination that the confirmation of the communication log and raw call detail record match the respective expected result, triggering execution of a predefined function,
responsive to a determination that the confirmation of the communication log and raw call detail record do not match the respective expected result, commanding termination of the call from the mobile communication device, and
logging the determinations in the test storage.

16. The system of claim 15, wherein the at least one communication device is a mobile communication device, and wherein the communication module is a radio transceiver.

17. The system of claim 15, wherein the at least one communication device is a landline communicatively coupled with the communication module that includes a transceiver.

18. The system of claim 15,
wherein each of the plurality of raw call detail records includes any of a data file or a live data stream that is in progress,
wherein monitoring the communication log comprises:
accessing the communication logs associated with the communication device, and
wherein monitoring the raw call detail record comprises:
controlling the monitor component,
commanding access of the raw call detail record on the raw call detail record storage, and
inspecting the raw call detail record.

19. The system of claim 15, wherein the predefined function comprises any of call forwarding, call waiting, call transfer, a multiparty call, information retrieval, identification visibility, assistance, or bill payment.

20. The system of claim 15, wherein the call from the originating mobile communication device includes any of a voice call, a data call, a short message service (SMS), or a multimedia message service (MMS).

* * * * *